US009692092B2

(12) United States Patent
Walser et al.

(10) Patent No.: US 9,692,092 B2
(45) Date of Patent: Jun. 27, 2017

(54) BATTERY PACK FOR A MOTOR VEHICLE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Daniel Walser, Clermont-Ferrand (FR); Bruno Fragniere, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 7 days.

(21) Appl. No.: 14/897,808

(22) PCT Filed: Jun. 11, 2014

(86) PCT No.: PCT/EP2014/062136
§ 371 (c)(1),
(2) Date: Dec. 11, 2015

(87) PCT Pub. No.: WO2014/198778
PCT Pub. Date: Dec. 18, 2014

(65) Prior Publication Data
US 2016/0126602 A1   May 5, 2016

(30) Foreign Application Priority Data
Jun. 13, 2013 (FR) ...................................... 13 55505

(51) Int. Cl.
*H01M 10/613* (2014.01)
*H01M 10/625* (2014.01)
(Continued)

(52) U.S. Cl.
CPC ...... *H01M 10/613* (2015.04); *F28D 15/0275* (2013.01); *F28D 15/04* (2013.01);
(Continued)

(58) Field of Classification Search
CPC ........... H01M 10/613; H01M 10/6555; H01M 2/1077; H01M 10/6552; H01M 10/625; F28D 15/04
See application file for complete search history.

(56) References Cited

U.S. PATENT DOCUMENTS

2010/0129703 A1\* 5/2010 Caumont ................. H01G 2/04
429/120
2011/0155355 A1\* 6/2011 Chen ...................... B82Y 30/00
165/133
(Continued)

FOREIGN PATENT DOCUMENTS

CN 101958440 A 1/2011
DE 197 24 020 A1 1/1998
(Continued)

*Primary Examiner* — Stewart Fraser
(74) *Attorney, Agent, or Firm* — Fitzpatrick, Cella, Harper & Scinto

(57) ABSTRACT

A battery pack includes a battery module having a set of battery cells and at least one cooling device. Each cooling device includes a heat collecting plate, a heat duct, and a heat dissipating element. The heat collecting plate is in contact with an outer surface of at least one battery cell of the set of battery cells. The heat duct is in contact with the heat collecting plate. The heat dissipating element has a circular orifice in which the heat duct is positioned. The heat duct contains a fluid. A connection between the heat dissipating element and the heat duct is established by tinning. A method for producing the battery pack is provided.

9 Claims, 2 Drawing Sheets

(51) Int. Cl.
*F28D 15/02* (2006.01)
*H01M 10/6563* (2014.01)
*H01M 10/6551* (2014.01)
*H01M 10/6552* (2014.01)
*F28D 15/04* (2006.01)
*H01M 2/10* (2006.01)
*H01M 10/6555* (2014.01)
*H01M 10/643* (2014.01)

(52) U.S. Cl.
CPC ....... *H01M 2/1077* (2013.01); *H01M 10/625* (2015.04); *H01M 10/6551* (2015.04); *H01M 10/6552* (2015.04); *H01M 10/6555* (2015.04); *H01M 10/6563* (2015.04); *H01M 10/643* (2015.04); *H01M 2220/20* (2013.01)

(56) References Cited

U.S. PATENT DOCUMENTS

| | | | |
|---|---|---|---|
| 2011/0206965 A1 | 8/2011 | Han et al. | 429/120 |
| 2015/0037647 A1* | 2/2015 | Nguyen | H01M 10/625 |
| | | | 429/120 |

FOREIGN PATENT DOCUMENTS

| | | |
|---|---|---|
| JP | S61-260551 A | 11/1986 |
| JP | H07-45310 A | 2/1995 |
| JP | 2006-210245 A | 8/2006 |
| JP | 2009-147187 A | 7/2009 |

* cited by examiner

BATTERY PACK FOR A MOTOR VEHICLE

FIELD OF THE INVENTION

The present invention relates to a battery pack for a vehicle, in particular for a motor vehicle. More precisely, the present invention relates to a battery pack comprising a plurality of battery modules and compromising between mass/efficiency/size with the objective of improving the performance of current batteries.

Motor vehicles having an internal combustion engine have long been provided with electric batteries used in particular to allow the start-up of the vehicle and to provide the vehicle with the necessary electrical energy when the engine is stopped so as to maintain certain functions, such as the headlights, the hazard lights, and the on-board electronics.

With the development of electric vehicles and hybrid vehicles, the question of batteries has become significant in the automotive industry. In fact, the batteries from now on must provide a sufficient amount of energy to offer sufficient autonomy to vehicles, whilst having a service life that does not require battery changes too frequently. In addition, the mass and size of the battery must be limited compared to the efficiency thereof. Lastly, it is useful that the batteries can function correctly in all driving conditions of the vehicle, whatever the conditions of temperature, humidity, etc.

BRIEF DESCRIPTION OF THE INVENTION

The present invention thus aims to propose a battery pack compromising between mass/efficiency/size and aiming to improve the performance of current batteries, said battery pack also having advantageous features in terms of cooling and tightness.

Thus, the present invention relates to a battery pack having a battery module having a set of battery cells and at least one cooling device. The cooling device comprises a heat collecting plate in contact with an outer surface of at least one battery cell, a heat duct in contact with the heat collecting plate, and a heat dissipating element. The heat dissipating element has a circular orifice in which the heat duct is positioned containing a fluid. This battery pack is characterized in that the connection between the dissipating element and the heat duct is established by tinning. Similarly, the heat collecting plate is also fixed by tinning. In a preferred embodiment the fluid contained in the heat ducts is under a determined absolute pressure.

The principle of the cooling device is as follows: each heat duct, also referred to as a heat pipe, contains a fluid that evaporates at the battery cells, under the effect of the heat emitted during operation of the battery. This fluid then circulates in the heat pipe as far as the start of the dissipating element, i.e. as far as the inlet of the dissipating device closest to the battery cells. When the fluid is in the part of the heat ducts positioned in the dissipating element, the atmospheric air circulating in this dissipating element makes it possible to cool the fluid until said fluid returns to the liquid phase and falls back towards the battery cells.

Thus, for correct operation of the heat pipes, it is necessary that the fluid, after having returned to the liquid phase, displaces as far as the elements to be cooled. Should the battery module be in a vertical position, gravity allows this displacement, since the fluid in liquid phase is heavier than in gaseous phase. As a result, with operation of the battery in a position other than the vertical position, the operation is hampered, since gravity no longer acts in a direction parallel to the orientation of the heat ducts, and therefore no longer allows the fluid to be displaced as effectively. In order to remedy this a number of solutions are conceivable. Thus, in a preferred embodiment, the heat tubes are furrowed on their inner surface in the longitudinal direction, so as to increase the displacement of the fluid. In another configuration it is useful to install, inside the heat ducts, means that enable the displacement of the fluid by capillary action, for example a lattice.

The use of a tinning method to establish the connection between the dissipating element and the heat duct, and also at the heat collecting plate, makes it possible to decrease the thermal resistance and thus to increase the performance of the cooling device.

The term 'battery cell' used here is equivalent to the term 'electric accumulator' or 'battery element'. The battery cells, in one example, are cylindrical. However, a battery pack according to the invention can be used with battery cells of any form and any power.

In an advantageous embodiment the heat dissipating element comprises a set of fins arranged one above the other without contact, each of these fins having a circular orifice in which the heat duct is positioned. The stack is formed in the longitudinal direction with respect to the battery cells. The fins of the heat dissipating element advantageously have a trapezoidal form. These fins are made of aluminium for example, however they may also be made of copper or of a different metal material.

In another advantageous embodiment the battery pack comprises at least two battery modules and an airtight casing surrounding the battery cells of the set of modules. It is useful that the heat dissipating elements are located outside the airtight casing, because otherwise the cooling would not be possible, since the temperature inside the casing would remain relatively high. If, however, it is desired to use a cover to encapsulate the assembly, it is useful to provide substantial air inlets in this cover.

The invention also relates to a method for producing a battery pack comprising a battery module having a set of battery cells and at least one cooling device, the device comprising a heat collecting plate in contact with an outer surface of at least one battery cell, a heat duct in contact with the heat collecting plate, and a heat dissipating element, the heat dissipating element having a circular orifice intended to accommodate the heat duct containing a fluid, the method having the following steps covering the heat dissipating element with a layer of copper, inserting the heat duct into the orifice in the dissipating element, positioning a tin ring on the dissipating element, around the heat duct, placing the assembly in a heating device.

In an advantageous embodiment the method comprises the step, prior to the step of inserting the heat duct, of covering the heat dissipating element and the heat duct by a layer of tin.

BRIEF DESCRIPTION OF THE DRAWINGS

Further objectives and advantages of the invention will become clear from the following description of a preferred, but non-limiting embodiment, illustrated by the following drawings, in which.

DESCRIPTION OF THE BEST WAY OF CARRYING OUT THE INVENTION

Figure 1:
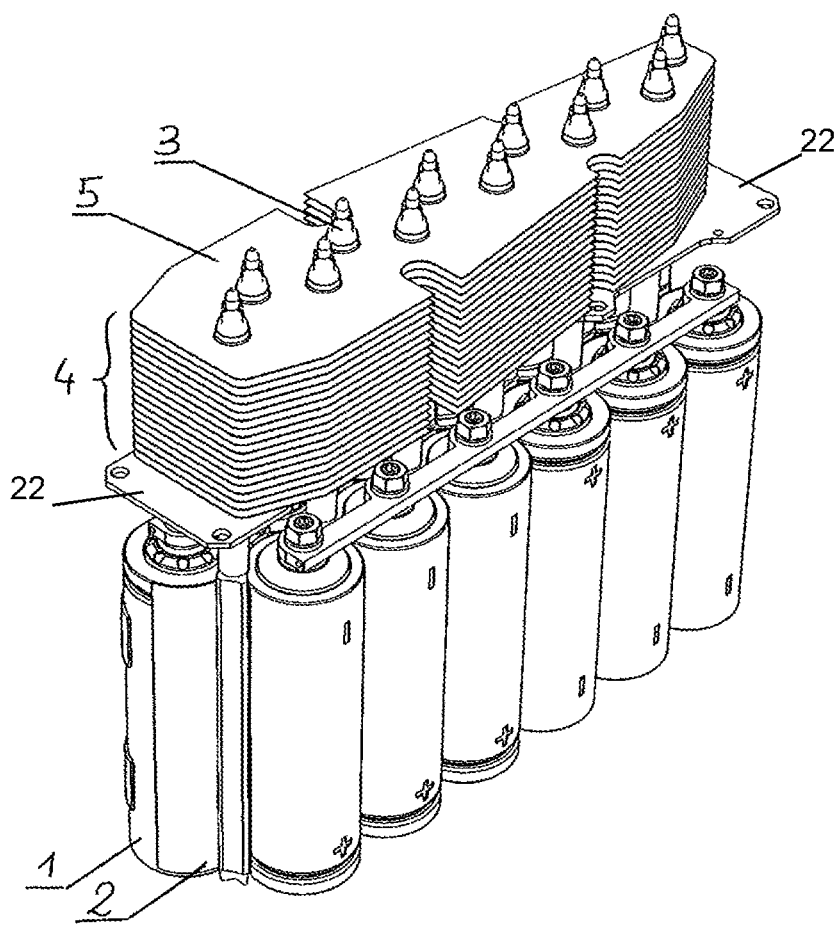
FIG. 1 shows a module of a battery pack according to the invention.

FIG. 1 shows a module of a battery pack according to the invention. It comprises twelve cylindrical battery cells 1, disposed in two parallel rows of six cells. It should be noted that it is possible to use battery cells of a different form, for example of octagonal section. A heat collecting plate 2 is located between these cells. This plate comes into contact with part of the outer surface of each of the battery cells 1. The plate advantageously comes into contact with a battery cell over the entire length thereof. In fact, the increase of the contact surface makes it possible to increase the diffusion of the heat diffused by the battery cell, and therefore to increase the efficiency of the cooling device.

In the embodiment shown in this drawing the heat collecting plate 2 is formed of two plates connected so as to form a single element, such that spaces are formed between the two plates, allowing the insertion of heat ducts 3, also referred to as heat pipes. In another example (not shown), one heat collecting plate is used for each heat duct 3, which results in six heat collecting plates for each row of cells.

The battery pack also comprises a dissipating element 4 comprising a set of fins 5 stacked one above the other and spaced so as to allow the passage of air between two fins. These fins are each drilled with a number of orifices 6, which are aligned with one another, making it possible to position each of the heat ducts 3 in the heat dissipating element.

In one exemplary embodiment the fins 5 are made of aluminium, the heat tubes or ducts 3 are made of copper, and the heat collecting plates 2 are made of aluminium. In another example it is possible to produce all of these elements from copper, which makes it possible to increase the efficiency of the device. However, copper is a material that is more costly and heavier than aluminium.

The number of fins 5, also referred to as leaves, is twenty, for example. This choice results from a compromise between efficiency/weight/size. In fact, if the number of fins is too high, the fins positioned at the top of the stack will be useless, because all of the liquid present in the heat ducts will have been evaporated before reaching these fins. It should be noted that the term "top of the stack" here designates the fins located furthest from the battery cells. Conversely, if the number of fins is too low, this will promote a saturation, which will make condensation completely impossible and will therefore reduce the efficiency of the device.

Figure 2:
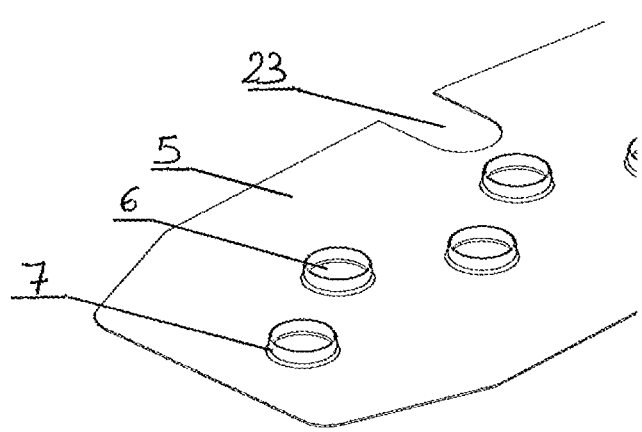
FIG. 2 shows the detail of a fin of a dissipating element in the sense of the present invention.

In a preferred embodiment the connection between the fins 5 and the heat tubes 3 is established by a tinning method, which will be described with reference to FIG. 2. In a first step the copper tubes 3 are covered with a layer of tin, for example with a thickness of five microns. The aluminium fins 5, one of which is shown in FIG. 2, are covered with a layer of copper, for example with a thickness of ten microns, then with a layer of tin, for example with a thickness of five microns. It should be noted that the step of covering the tubes 3 and the fins 5 with tin is not absolutely necessary.

In a second step a heat tube 3 (not shown in FIG. 3) is inserted into one of the orifices 6 formed in the thickness of the fin 5. A tin ring 7 is then positioned around the heat tube 3 in a third step. The last step consists of placing the assembly in a heating device, such as a furnace, in order to effect the tinning as such. This production method makes it possible to provide a device in which the heat conduction is significantly improved compared with the known devices. Thus, a heat dissipating element according to the invention offers good performance in terms of thermal efficiency whilst reducing the weight of the assembly due to the use of heat pipes made of copper and fins made of aluminium.

In a preferred exemplary embodiment the fins 5 forming the dissipating element have a trapezoidal form, enabling a better distribution of the fresh air over the different heat ducts 3. In fact, the air entering at the inlet point passes over the entire fin in the longitudinal direction before reaching the heat ducts furthest from this inlet point. The air heats up upon contact with the first heat ducts 3 encountered over its path and thus allow a less effective cooling when it reaches the last heat ducts.

In order to remedy this, a trapezoidal form is used, such that the air entering the fins at the inlet point directly penetrates the part of the fins located to the rear of the pack (the terms 'front' and 'rear' are understood here in the direction of travel of the air) without having to be reheated, since it has not been in contact with any heat duct. Thus, the homogeneity of the temperatures between the different battery cells is improved.

Figure 3A:
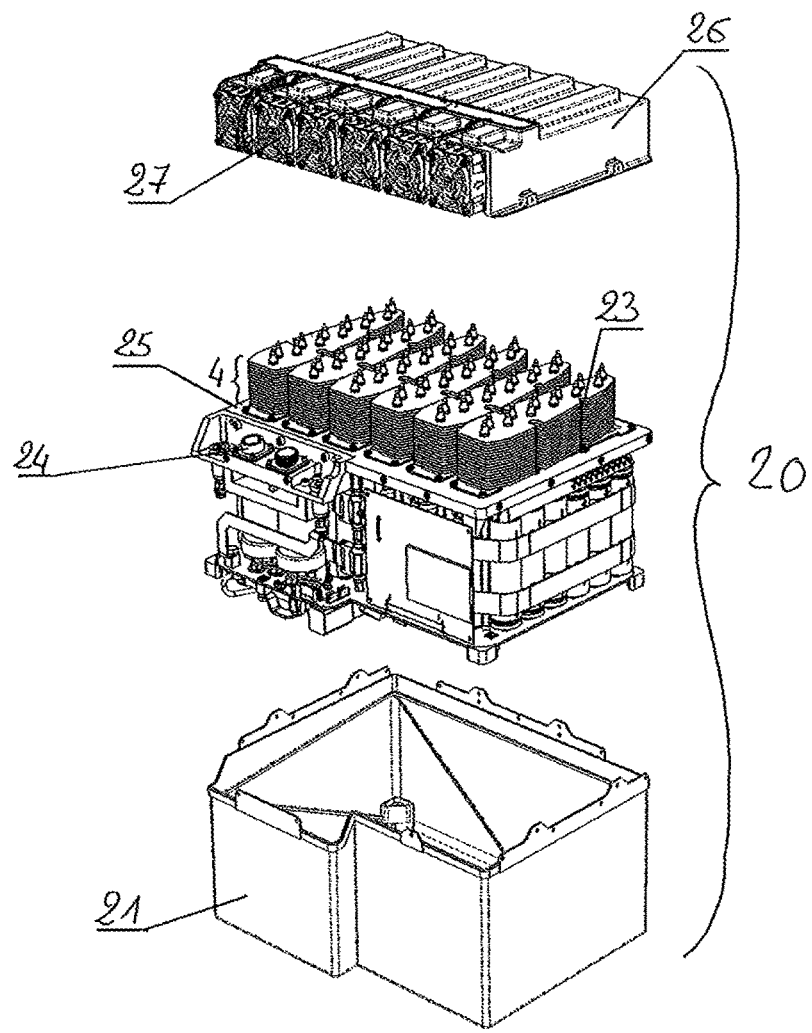
FIGS. 3a and 3b show a battery pack according to the invention.
Figure 3B:
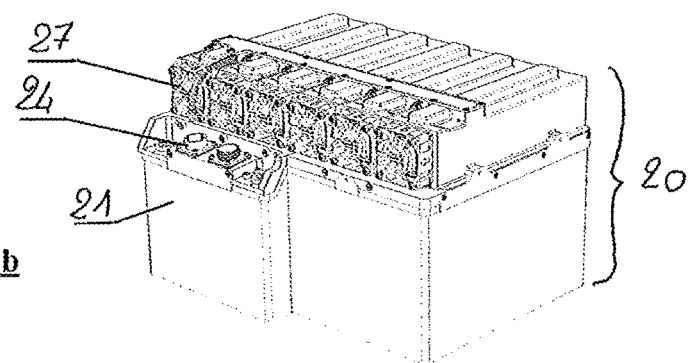

In addition, in an advantageous configuration, a battery pack according to the invention comprises a plurality of battery modules such as that shown in FIG. 1. Thus, for example in FIGS. 3a and 3b, six battery modules are positioned side by side in order to form the battery pack 20. It should be noted that FIG. 3a shows an exploded view of the pack shown in FIG. 3b. The pack comprises a casing 21, which surrounds the battery cells so as to make the assembly airtight, topped by a cover 25 forming a system plate. Thus, the battery cells are connected directly to this system plate, which makes it possible to eliminate the wired connections and therefore to reduce the size of the device.

In addition, the tightness of the casing enables a use of the battery in extreme conditions, in particular when it is used in a motor vehicle. The battery pack 20 in addition comprises electrical connectors 24 allowing the battery to be connected in a vehicle or any other device using said battery. These connectors are selected so as not to alter the tightness of the assembly.

The heat dissipating elements are then located above this casing 21, and are fixed thanks to mechanical supports 22. This fixing is achieved by fixing means such as screws, of which the installation is made possible thanks to cutouts 23 (see also FIG. 2) of semi-circular form, formed on the longitudinal sides of the fins. The positioning of the heat dissipating elements outside the airtight casing does not pose any problem, since there is no fluid circulating in these elements. In fact, the fluid serving to transport calories is enclosed in the heat ducts. The heat ducts are closed by welding for example, which makes it possible to avoid the use of a seal of the flat or O-ring type in order to guarantee the tightness. Such a device thus makes it possible to avoid leaks and therefore does not adversely affect the safety of the equipment using a battery pack according to the invention.

In addition, in an exemplary configuration, an additional cover 26 is used to surround the heat dissipating elements. This cover 26 comprises air inlets 27 making it possible to allow atmospheric air to penetrate between the fins 5 of the dissipating elements.

Thus, the present invention proposes an airtight and compact battery pack provided with means that make it possible to cool the battery cells uniformly.

The invention claimed is:

1. A battery pack, comprising:
a battery module including a plurality of battery cells; and
at least one cooling device,
wherein each cooling device of the at least one cooling device includes:
a heat collecting plate,
a heat duct, and
a heat dissipating element, and
wherein, for each cooling device of the at least one cooling device:
the heat collecting plate is in contact with an outer surface of at least one battery cell of the plurality of battery cells,
the heat duct is in contact with the heat collecting plate,
the heat dissipating element has a circular orifice in which the heat duct is positioned,
the heat duct contains a fluid, and
a connection between the heat dissipating element and the heat duct is tinned.

2. The battery pack according to claim 1, wherein the heat dissipating element includes a plurality of fins arranged in a stack without being in contact with each other, each fin of the plurality of fins having a circular orifice in which the heat duct is positioned.

3. The battery pack according to claim 2, wherein the plurality of fins of the heat dissipating element have a trapezoidal form.

4. The battery pack according to claim 1, wherein an inner surface of the heat duct has grooves oriented longitudinally.

5. The battery pack according to claim 1, wherein displacement of the fluid in the heat duct occurs by capillary action.

6. The battery pack according to claim 1, further comprising:
at least one other battery module including a plurality of battery cells, the battery module and the at least one other battery module forming a set of battery modules; and
an airtight casing surrounding the pluralities of battery cells of the set of battery modules.

7. The battery pack according to claim 6, wherein each heat dissipating element of the set of battery modules is located outside the airtight casing.

8. A method for producing a battery pack that includes at least one cooling device and a battery module having a plurality of battery cells, in which each cooling device includes a heat collecting plate in contact with an outer surface of at least one battery cell, a heat duct in contact with the heat collecting plate, and a heat dissipating element having a circular orifice structured to accommodate the heat duct, and in which each heat duct contains a fluid, the method comprising, for each cooling device:
covering the heat dissipating element with a layer of copper;
inserting the heat duct into the orifice of the heat dissipating element;
positioning a tin ring on the heat dissipating element around the heat duct to form an assembly; and
placing the assembly in a heating device.

9. The method according to claim 8, further comprising, prior to the inserting of the heat duct into the orifice, covering the heat duct and the heat dissipating element with a layer of tin.

* * * * *